United States Patent
Ejderklint

(10) Patent No.: US 7,201,545 B2
(45) Date of Patent: Apr. 10, 2007

(54) TOOL, A CUTTING INSERT, A SHIM AND USE OF THE CUTTING INSERT

(75) Inventor: Christer Ejderklint, Fagersta (SE)

(73) Assignee: Seco Tools AB (SE)

( * ) Notice: Subject to any disclaimer, the term of this patent is extended or adjusted under 35 U.S.C. 154(b) by 0 days.

(21) Appl. No.: 11/163,333

(22) Filed: Oct. 14, 2005

(65) Prior Publication Data

US 2006/0083594 A1 Apr. 20, 2006

(30) Foreign Application Priority Data

Oct. 15, 2004 (SE) ................................. 0402508

(51) Int. Cl.
*B23B 27/16* (2006.01)

(52) U.S. Cl. .................. 409/131; 407/46; 407/101

(58) Field of Classification Search ................. 407/46, 407/101; 409/131, 132
See application file for complete search history.

(56) References Cited

U.S. PATENT DOCUMENTS

| | | | | |
|---|---|---|---|---|
| 280,148 | A * | 6/1883 | Douglas | 407/64 |
| 1,629,667 | A * | 5/1927 | Knipple | 407/103 |
| 3,629,919 | A * | 12/1971 | Trevarrow, Jr. | 407/103 |
| 4,209,047 | A * | 6/1980 | Weill | 144/208.8 |
| 4,437,802 | A * | 3/1984 | Hall, Jr. | 408/197 |
| 5,682,803 | A * | 11/1997 | Boianjiu | 81/1.11 |
| 5,810,518 | A * | 9/1998 | Wiman et al. | 407/102 |
| 5,924,826 | A * | 7/1999 | Bystrom et al. | 407/103 |
| 5,931,613 | A * | 8/1999 | Larsson | 407/103 |
| 6,146,060 | A * | 11/2000 | Rydberg et al. | 407/40 |
| 6,146,061 | A * | 11/2000 | Larsson | 407/103 |
| 6,244,790 | B1 * | 6/2001 | Kingdom et al. | 407/110 |
| 6,343,898 | B1 * | 2/2002 | Sjoo et al. | 407/101 |
| 6,736,574 | B2 * | 5/2004 | Persson et al. | 407/77 |
| 6,840,716 | B2 * | 1/2005 | Morgulis et al. | 407/34 |
| 6,872,033 | B2 * | 3/2005 | Rydberg | 407/103 |
| 6,880,437 | B2 * | 4/2005 | Sjoo et al. | 82/158 |
| 6,921,234 | B2 * | 7/2005 | Arvidsson et al. | 407/103 |
| 6,948,889 | B2 * | 9/2005 | Arvidsson | 407/35 |
| 6,960,049 | B2 * | 11/2005 | Inayama | 407/103 |
| 7,001,114 | B2 * | 2/2006 | Blucher et al. | 407/103 |
| 7,021,871 | B2 * | 4/2006 | Arvidsson et al. | 407/113 |
| 2004/0265074 | A1 * | 12/2004 | Hessman et al. | 407/113 |
| 2005/0169723 | A1 * | 8/2005 | Schafer et al. | 409/234 |

FOREIGN PATENT DOCUMENTS

DE 3402547 A1 * 8/1985

* cited by examiner

*Primary Examiner*—Monica Carter
*Assistant Examiner*—Sara Addisu
(74) *Attorney, Agent, or Firm*—WRB-IP LLP

(57) ABSTRACT

The present invention relates to a tool, a cutting insert and a shim for cutting machining. The tool includes a holder for turning or milling, a shim and an indexable cutting insert. The shim has an upper side and the cutting insert has a lower side. The lower side includes protrusions, The cutting insert and the shim are provided to abut against each other in three points. The upper side of the shim includes recesses. The recesses are provided spaced from the projections.

20 Claims, 4 Drawing Sheets

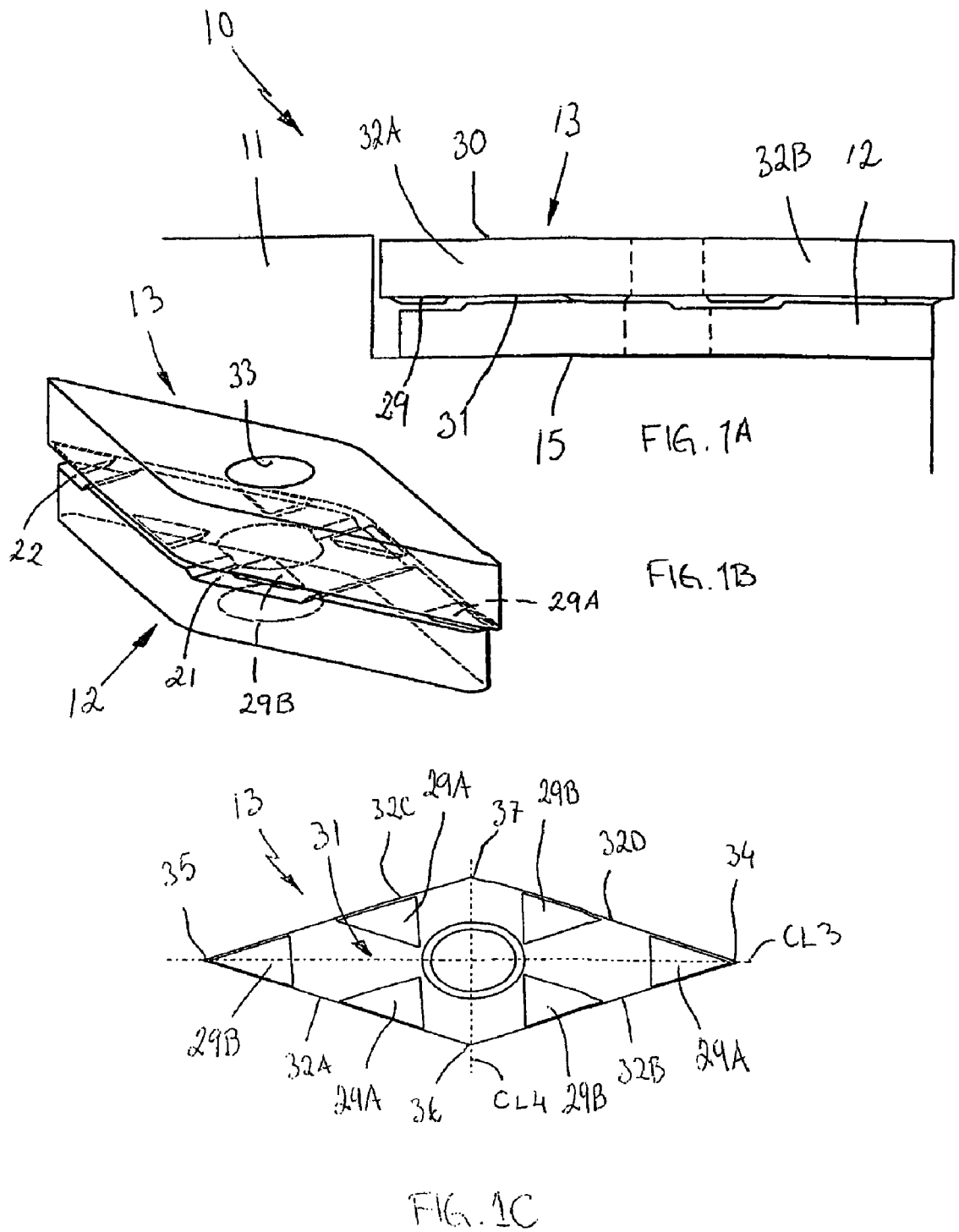

US 7,201,545 B2

TOOL, A CUTTING INSERT, A SHIM AND USE OF THE CUTTING INSERT

FIELD OF THE INVENTION

The present invention relates to a tool, a cutting insert, a shim and use of the cutting insert for chip removing machining according to the preambles of the independent claims.

It is difficult to manufacture directly pressed hard metal cutting inserts with completely planar lower sides or support surfaces. This is due to shape changes during the sintering process are difficult to predict since these depend on many factors, for example the manufacturing of punches, the pressing parameters, the powder material, the powder preparation and the furnace parameters. By having a convex lower side the ends of the cutting insert lift from the support surface in the holder and vibrational problems are obtained. However, if the lower side becomes concave, great tensions are obtained at the lower side at mounting with a screw or a clamp, which the hard metal normally does not withstand.

A known cutting insert has been provided with protrusions at the corner portions of the support surface. The number of protrusions is identical to the number of cutting insert corners, which means that for example the support points of a square cutting insert become statically indefinite with above-captioned drawbacks as consequences.

It is desirable to provide a tool, a cutting insert, a shim and use of the cutting insert, which provide exactly defined abutment between the support points.

It is desirable to provide a tool, a cutting insert, a shim and application of the cutting insert, which provide minimized leverage for the fastening means and thus low tensions in the cutting insert.

According to an aspect of the present invention, a tool for cutting machining comprises a holder for turning or milling, a shim and an indexable cutting insert, wherein the shim has an upper side and the cutting insert has a lower side, which lower side comprises protrusions, wherein the cutting insert and the shim abut against each other at three points, and wherein the upper side of the shim comprises recesses, the recesses being spaced from the projections.

According to another aspect of the invention, a shim is provided for a tool for cutting machining comprising a holder for turning or milling, the shim and an indexable cutting insert. The shim comprises an upper side, a lower side, and edge surfaces extending between the lower side and the upper side, the upper side comprising recesses, wherein the upper side comprises at least one support surface.

According to another aspect of the invention, a shim is provided for a tool for cutting machining comprising a holder for turning or milling, the shim and an indexable cutting insert. The shim comprises an upper side, a lower side, and edge surfaces extending between the lower side and the upper side, the upper side comprising recesses, wherein the upper side comprises two support surfaces.

According to another aspect of the invention, an indexable cutting insert is provided for a tool for cutting machining comprising a holder for turning or milling, a shim and the indexable cutting insert. The cutting insert comprises an upper side and a lower side, the upper side and the lower side being connected by edge surfaces, wherein cutting edges are formed at least where the edge surfaces intersect the upper side, wherein the lower side comprises protrusions, wherein the cutting insert is provided to abut against a shim at three points, the cutting insert having a number of corner portions, and wherein the lower side comprises more than three protrusions comprising support surfaces, the support surfaces being substantially provided in a plane and a number of protrusions is more than a number of corner portions of the cutting insert.

According to another aspect of the present invention, a method of using an indexable cutting insert in a tool for cutting machining comprising a holder for turning or milling, a shim and an indexable cutting insert is provided. The shim has an upper side and the cutting insert has a lower side, which lower side comprises a plurality of protrusions, the cutting insert and the shim are adapted to abut against each other at three points, and the upper side of the shim comprises recesses. The method comprises arranging the cutting insert in a mounted position relative to the shim such that the protrusions are spaced from the recesses and such that three of the protrusions of the cutting insert contact the shim when in the mounted position.

BRIEF DESCRIPTION OF THE DRAWINGS

Below follows an embodiment of the invention that is described with reference to the enclosed drawings, wherein:

FIG. 1A schematically shows a side view of a tool according to one embodiment of the invention;

FIG. 1B schematically shows a perspective view of the tool in FIG. 1A.

FIG. 5C shows a cutting insert according to an embodiment of the invention in a bottom view.

FIG. 3A–FIG. 3K schematically show projections in plane views of parts of further alternative embodiments of cutting inserts and shims according to the present invention.

DETAILED DESCRIPTION

Figure 1D:
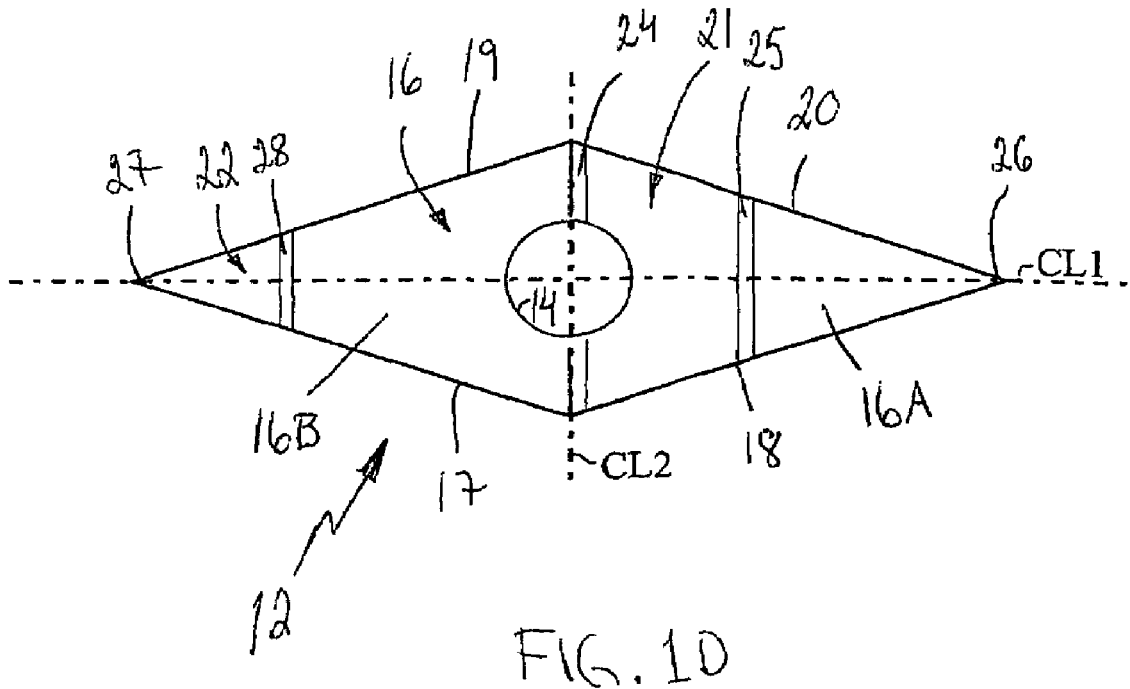
FIG. 1D shows a shim according to an embodiment of the invention in a bottom view.

The tool 10 shown in FIGS. 1A and 1B comprises a holder 11 for turning or milling, a shim 12 and an indexable cutting insert 13 made from cemented carbide. The cutting insert 13 and the shim comprise through-holes to be held firmly in a conventional manner against holder by means of a screw, not shown. Alternatively, a conventional clamp may be used.

The holder 11 may be a square shank and has a pocket for mounting of the shim. The pocket comprises at least two projecting shoulders against which the edge surfaces of the cutting insert can abut.

The shim 12 has a substantially rhombical basic shape and comprises an imaginary major axis CL1 and an imaginary minor axis CL2. With "rhomb" is here meant an oblique equilateral parallelogram. The axes or diagonals are perpendicular to each other. The major axis coincides with the bisectors in the acute-angled corner portions in the rhomb while the minor axis coincides with the bisectors in the obtuse-angled corner portions. The axes coincide with the center of the hole 14 in this embodiment. The shim 12 has a lower side 15, an upper side 16 and edge surfaces 17, 18, 19 and 20 extending therebetween. The distance between two adjacent corner portions constitutes an edge length. The upper side and lower side are substantially parallel in this embodiment. The upper side 16 comprises a first recess 21 and a second recess 22. The first recess 21 consists of a groove 23, whose main direction is parallel with the minor axis CL2 such that it breaks through the edge surfaces 18, 20. The groove 23 is bordered by a first wall 24 and a second wall 25 in the direction of the major axis CL1. The first wall is centrally intersected by the hole 14 and the second wall 25 is provided approximately halfway in direction towards a first acute-angled corner portion 26. The second recess 22 is provide in connection with a second acute-angled corner portion 27 and is limited only in one direction by a third wall 28, i.e. in direction towards the hole 14. The first recess 21 is longer than the second recess 22, preferably about twice as long, when the respective recess is measured along the major axis CL1. The upper side 16 to the side of the recesses 21, 22 remains in the shape of two support surfaces 16A, 16B, which are provided in same plane. The recesses 21, 22 are intended to constitute clearances for protrusions 29 provided on the lower side of the cutting insert 13. Each recess 21, 22 breaks through at least one associated edge surface 17, 18, 19, 20. Naturally, the recesses may have another shape than shown as long as they can be provided spaced from the projections. Thus, the projections do not come in contact with the recesses during machining.

FIGS. 1A, 1B and 1C show a cutting insert 13 according to the present invention. The cutting insert 13 comprises an upper side 30 and a lower side 31, which are connected by edge surfaces 32A, 32B, 32 C and 32D. Cutting edges are developed at least where the edge surfaces intersect the upper side 30. The cutting insert 13 has a substantially rhombical basic shape and comprises, in analogy with the shim 12 above, an imaginary major axis CL3 and an imaginary minor axis CL4. The axes or diagonals are perpendicular to each other. The major axis coincides with the bisectors in the acute-angled corner portions 34, 35 in the rhomb while the minor axis coincides with the bisectors in the obtuse-angled corner portions 36, 37. The corner portion is here meant to be seen in a top view. The axes coincide with the center of the hole 33 in this embodiment. The upper side and lower side are in this embodiment substantially parallel. The lower side 31 comprises six protrusions 29, whereof one protrusion has been provided in connection with each acute-angled corner portion. The three projections depicted 29A in FIG. 5C are provided to constitute the three support surfaces of the cutting insert during use together with the shim 12. The other three projections depicted 29B in FIG. 5C are provided to constitute the three support surfaces of the cutting insert when the cutting insert has been indexed 1800 relative to the shim. Consequently, the projections 29 are provided in sets of three protrusions, whereof two protrusions have been provided closer to the cutting insert hole 33 than the protrusion at the acute-angled corner portion. That is, the distance L1 (as illustrated in FIG. 1E) between the protrusion at the acute-angled corner portion, where the area of engagement of the cutting insert is defined, and the center of the cutting insert is greater than the distances L2, L3 between the other two projections and the center of the cutting insert. All protrusions have abutment surfaces, which are provided in or touch a common plane. Each projection projects from the lower side of the cutting insert a distance in the magnitude of 0.01 mm–0.5 mm, preferably 0.05 mm–0.1 mm.

In FIG. 1E the protrusions 29A of the cutting insert 13, being active in this position, are shown as filled, black circles while, in this situation passive, protrusions 29B are shown as white circles. Other parts of the cutting insert are not shown in FIG. 1E. Neither are the holes 14 and 33 shown since those are optional. The active support surfaces 16A and 16B of the shim 12 are shown by means of dashed areas while the passive recesses 21 and 22 are shown as white areas. With "active support surfaces 16A and 16B" is here meant surfaces, which are intended that to be reached by protrusions of the cutting insert. The sign "*" in i.a. FIG. 1E depicts the approximate area of engagement of the cutting insert.

When the cutting insert 13 is mounted against the shim 12 the projections, for example 29A, will be placed such that the abutment surfaces abut against the support surfaces 16A, 16B of the shim, as illustrated in FIG. 1E. The projections 29B will then be received the recesses 21 and 22. Subsequently, a fastening means, not shown, clamps the cutting insert against the shim. Thereby, a stable abutment between the cutting insert and the shim has been obtained at three points. The other three projections 29B are provided to constitute the three support surfaces of the cutting insert when the cutting insert has been indexed 1800 relative to the shim.

FIGS. 2A–2H and FIGS. 3A–3K show in analogy with FIG. 1E a number of alternative embodiments of a lower side of a cutting insert and a shim, all entailing a stable three point abutment.

Figure 1E:
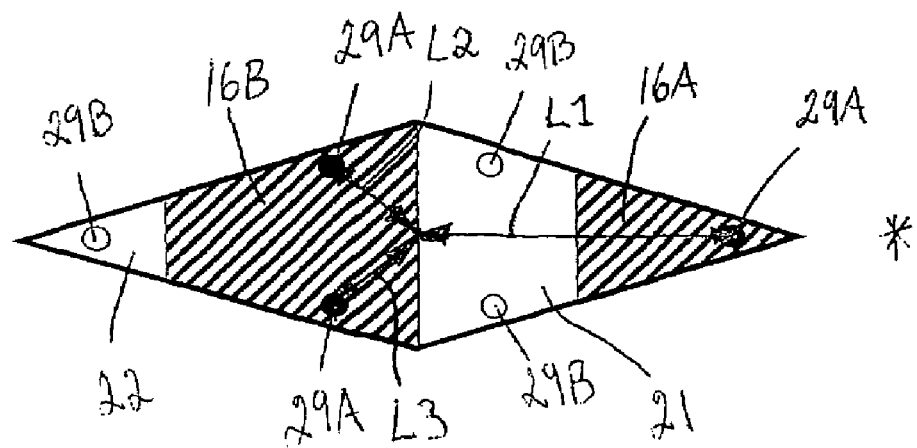
FIG. 1E schematically shows a projection in plane view of parts of the cutting insert and the shim.
Figure 2A:
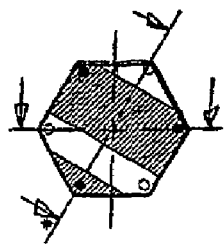
FIG. 2A–FIG. 2G schematically show projections in plane views of parts of alternative embodiments of cutting inserts and shims according to the present invention.

FIG. 2A shows a lower side of a cutting insert and a shim with a hexagonal basic shape where the projections have been provided in the vicinity of the corner portion while the recesses have been provided substantially as in FIG. 1D. The number of protrusions is six while the number of recesses is two.

Figure 2D:
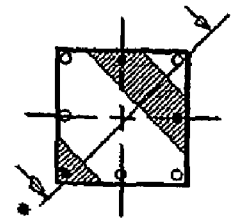
Figure 2B:
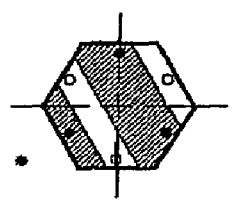

FIG. 2B shows a lower side of a cutting insert and a shim with hexagonal basic shape where the projections have been provided between the corner portions while the recesses have been provided substantially parallel with two of the edge surfaces of the cutting insert. With a lower side which has a hexagonal basic shape it is conceivable to provide a circular cutting edge. The number of protrusions is six while the number of recesses is two.

Figure 2E:
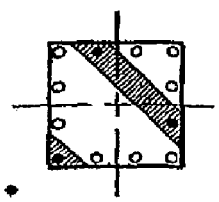
Figure 2C:
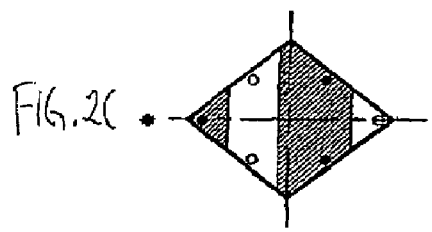

FIG. 2C shows a lower side of a cutting insert and a shim with a rhombical basic shape where the projections and the recesses have been provided substantially as in FIG. 1D, but with greater acute angles and smaller obtuse angles. The number of protrusions is six while the number of recesses is two.

FIG. 2D shows a lower side of a cutting insert and a shim with a square basic shape where the projections have been provided in the vicinity of the corner portions of the cutting insert while the recesses have been provided substantially as in FIG. 1D. The number of protrusions is eight while the number of recesses is two.

FIG. 2E shows a lower side of a cutting insert and a shim with a square basic shape where the projections have been provided in the vicinity of the corner portions of the cutting insert while the recesses have been provided substantially as in FIG. 1D. The number of protrusions is twelve while the number of recesses is two. The recesses are in this embodiment greater than as shown in FIG. 2D and covers more than 50% of the upper side of the shim.

Figures 2F, 2G:
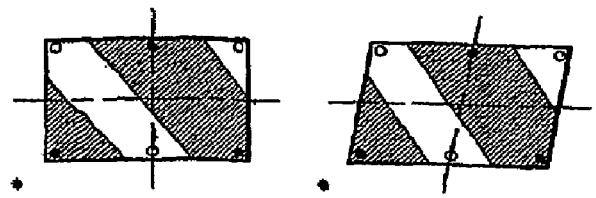

FIG. 2F shows a lower side of a cutting insert and a shim with a rectangular basic shape where the projections have been provided in the vicinity of the corner portions of the cutting insert while the recesses have been provided substantially as in FIG. 1D. The number of protrusions is six while the number of recesses is two.

FIG. 2G shows a lower side of a cutting insert and a shim with the basic shape of a rhomboid where the projections have been provided in the vicinity of the corner portions of the cutting insert while the recesses have been provided substantially as in FIG. 1D. A rhomboid is an oblique unequal sided parallelogram. The number of protrusions is six while the number of recesses is two.

Figure 2H:
FIG. 2H shows a detail of a lower side of the cutting insert.

FIG. 2H shows a detail of a lower side of a cutting insert where the projections consist of semi-spheres.

Figure 3A:
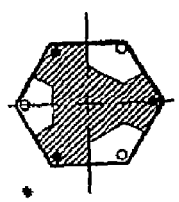

FIG. 3A shows a lower side of a cutting insert and a shim with a hexagonal basic shape where the projections have been provided in the vicinity of the corner portions of the cutting insert while one recess has been provided in every second corner portion of the shim. Each recess opens only into one edge surface in the shim. The number of protrusions is six while the number of recesses is three.

Figure 3H:
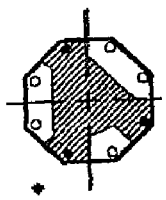
Figure 3D:
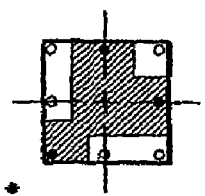
Figure 3K:
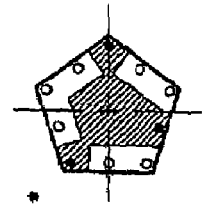
Figure 3B:
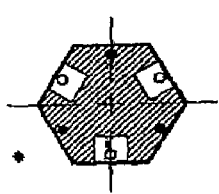

FIG. 3B shows a lower side of a cutting insert and a shim with a hexagonal basic shape where the projections have been provided between the corner portions of the cutting insert while three recesses open into every second edge surface of the shim. The number of protrusions is six while the number of recesses is three. With a lower side which has a hexagonal basic shape it is conceivable to provide the cutting insert edge circular. The number of protrusions is six while the number of recesses is three.

Figure 3I:
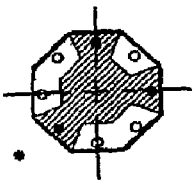
Figure 3E:
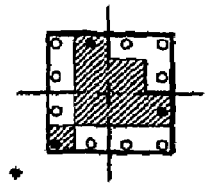
Figure 3C:
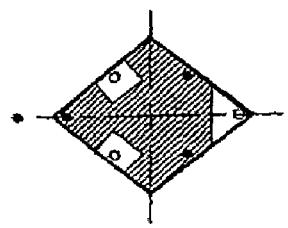

FIG. 3C shows a lower side of a cutting insert and a shim with a rhombical basic shape where the projections and the recesses have been provided substantially as in FIG. 2C, but with three recesses. Each recess opens into every second of the shim edge surfaces. The number of protrusions is six while the number of recesses is three.

FIG. 3D shows a lower side of a cutting insert and a shim with a square basic shape where the projections have been provided in the vicinity of the corner portions of the cutting insert while the recesses have been provided at three passive corner portions. Two of the recesses extend over half of the edge length of the shim while the remaining, third recess has been positioned at the corner portion positioned diagonally away from the active corner portion. The number of protrusions is eight while the number of recesses is three.

FIG. 3E shows a lower side of a cutting insert and a shim with a square basic shape where the projections have been provided in the vicinity of the corner portions of the cutting insert while the recesses have been provided substantially as in FIG. 3D. The number of protrusions is twelve while the number of recesses is three. The recesses are in this embodiment greater than as shown in FIG. 3D.

Figure 3F:
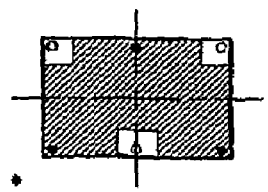

FIG. 3F shows a lower side of a cutting insert and a shim with a rectangular basic shape where the projections have been provided in the vicinity of the corner portions of the cutting insert while the recesses have been provided in two corner portions and at the middle of one of the edge surfaces of the shim. The latter edge surface is facing away from the corner portions that comprise the two recesses. The number of protrusions is six while the number of recesses is three.

Figure 3G:
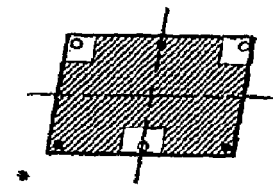

FIG. 3G shows a lower side of a cutting insert and a shim with the basic shape of a rhomboid where the projections have been provided in the vicinity of the corner portions of the cutting insert while the recesses have been provided substantially as in FIG. 3F. A rhomboid is an oblique unequal sided parallelogram. The number of protrusions is six while the number of recesses is three.

FIG. 3H shows a lower side of a cutting insert and a shim with an octagonal basic shape where the projections have been provided in the vicinity of the corner portions of the cutting insert while two recesses extend over two corner portions and one recess is provided at a corner portion adjacent to the active corner portion. The number of protrusions is eight while the number of recesses is three.

FIG. 3I shows a lower side of a cutting insert and a shim with an octagonal basic shape where the projections have been provided in the vicinity of the mid areas of the edge surfaces while two recesses extend over two edge lengths and a corner portion and a recess at one edge surface diagonally opposed to the active corner portion. The number of protrusions is eight while the number of recesses is three.

FIG. 3K shows a lower side of a cutting insert and a shim with a pentagonal basic shape where the projections have been provided in the vicinity of the corner portions of the cutting insert and at the middle of each edge surface while two recesses extend over two thirds of an edge surface while one recess extends over a corner portion and over two thirds of an edge surface. The number of protrusions is 10 while the number of recesses is three.

The use of the indexable cutting insert in the tool for cutting machining means that the cutting insert 13 is placed such that the projections 29A, 29B are provided spaced from the recesses 21, 22 and such that the projections do not engage with the recesses during the machining. The cutting insert then uses only three of all protrusions provided on the lower side of the cutting insert.

Common for all these embodiments is among other that the cutting insert and the shim are provided to abut against each other in three points and that the recesses are provided spaced from the projections when in mounted position. Thereby, exact defined abutment between the cooperating support surfaces is obtained without resorting to any grinding. The projections are provided in the vicinity of the corner portions and/or at the middle of the edge surfaces.

Furthermore, the lever is minimized for the fastening means such that only small tensions arise in the hard metal. For the pentagonal embodiment and most square embodiments apply that the distance L1 between the active protrusion at the area of engagement of the cutting insert and the center of the cutting insert is greater than the distances L2, L3 between the remaining two active projections and the center of the cutting insert. For the hexagonal and octagonal embodiments apply that the distances between the protrusion at the area of engagement of the cutting insert and the center of the cutting insert are equal to the distances between the remaining two active projections and the center of the cutting insert.

In the present application, the use of terms such as "including" is open-ended and is intended to have the same meaning as terms such as "comprising" and not preclude the presence of other structure, material, or acts. Similarly, though the use of terms such as "can" or "may" is intended to be open-ended and to reflect that structure, material, or acts are not necessary, the failure to use such terms is not intended to reflect that structure, material, or acts are essential. To the extent that structure, material, or acts are presently considered to be essential, they are identified as such.

Although the present invention has been described in connection with preferred embodiments, it is implicit for the person skilled in the art that combinations, additions, deletions, modifications, and substitutes not specifically described, can be made without departing from the scope of the invention, such as it is defined in the appended claims.

The disclosures in Swedish patent application No. 0402508-6, from which this application claims priority are incorporated herein by reference.

What is claimed is:

1. A tool for cutting machining comprising a holder for turning or milling, a shim and an indexable cutting insert, wherein the shim has an upper side and the cutting insert has a lower side, which lower side comprises protrusions, wherein the cutting insert and the shim abut against each other at only three points, and wherein the upper side of the shim comprises recesses, the recesses being spaced from the protrusions.

2. The tool according to claim 1, wherein the upper side of the shim comprises two support surfaces in substantially a same plane, the recesses defining clearances for the protrusions provided on the lower side of the cutting insert.

3. The tool according to claim 1, wherein the number of protrusions is greater than the number of recesses.

4. The tool according to claim 3, wherein the upper side of the shim comprises two support surfaces in substantially a same plane, the recesses defining clearances for the protrusions provided on the lower side of the cutting insert.

5. The tool according to claim 3, wherein the number of protrusions is more than three.

6. The tool according to claim 5, wherein the upper side of the shim comprises two support surfaces in substantially a same plane, the recesses defining clearances for the protrusions provided on the lower side of the cutting insert.

7. A shim for a tool for cutting machining, the tool comprising a holder for turning or milling, the shim and an indexable cutting insert, the shim comprising an upper side, a lower side, and edge surfaces extending between the lower side and the upper side, the upper side comprising recesses, wherein the upper side comprises at least one support surface, the at least one support surface defining only three insert abutment points.

8. The shim according to claim 7, wherein the at least one support surface is substantially planar.

9. The shim according to claim 7, wherein each recess breaks through at least one associated edge surface.

10. A shim for a tool for cutting machining, the tool comprising a holder for turning or milling, the shim and an indexable cutting insert; the shim comprising an upper side, a lower side, and edge surfaces extending between the lower side and the upper side, the upper side comprising recesses, wherein the upper side comprises two support surfaces, the two support surfaces defining only three insert abutment points.

11. The shim according to claim 10, wherein the support surfaces are substantially planar.

12. The shim according to claim 10, wherein each recess breaks through at least one associated edge surface.

13. An indexable cutting insert for a tool for cutting machining comprising a holder for turning or milling, a shim and the indexable cutting insert, wherein the cutting insert comprises an upper side and a lower side, the upper side and the lower side being connected by edge surfaces, wherein cutting edges are formed at least where the edge surfaces intersect the upper side, wherein the lower side comprises protrusions, wherein the cutting insert is provided to abut against a shim at oily three points, the cutting insert having a number of corner portions, and wherein the lower side comprises more than three protrusions, comprising support surfaces, the support surfaces being substantially provided in a plane and a number of protrusions is more than a number of corner portions of the cutting insert.

14. The cutting insert according to claim 13, wherein a distance between a first protrusion and a center of the cutting insert is greater Than a distance between two second protrusions and a center of the cutting insert.

15. The cutting insert according to claim 14, wherein the protrusions are triangular or semi-spherical.

16. The cutting insert according to claim 13, wherein the protrusions are provided only on the lower side of the cutting insert.

17. The cutting insert according to claim 16, wherein a distance between a first protrusion and a center of the cutting insert is greater than a distance between two second protrusions and a center of the cutting insert.

18. The cutting insert according to claim 17, wherein the protrusions are triangular or semi-spherical.

19. The cutting insert according to claim 13, wherein the support surfaces are substantially provided in a plane.

20. A method of using an indexable cutting insert in a tool for cutting machining comprising a holder for turning or milling, a shim and an indexable cutting insert, wherein the shim has an upper side and the cutting insert has a lower side, which lower side comprises a plurality of protrusions, wherein the cutting insert and the shim are adapted to abut against each other at only three points, and the upper side of the shim comprises recesses, comprising arranging the cutting insert in a mounted position relative to the shim such that the protrusions are spaced from the recesses and such that three of the protrusions of the cutting insert contact the shim when in the mounted position.

* * * * *